United States Patent [19]

Lu

[11] Patent Number: 5,929,983
[45] Date of Patent: Jul. 27, 1999

[54] OPTICAL APPARATUS FOR DETERMINING THE HEIGHT AND TILT OF A SAMPLE SURFACE

[75] Inventor: Huizong Lu, Coconut Creek, Fla.

[73] Assignee: International Business Machines Corporation, Armonk, N.Y.

[21] Appl. No.: 08/960,280

[22] Filed: Oct. 29, 1997

[51] Int. Cl.$^6$ .................................................. G01B 11/14
[52] U.S. Cl. .................. 356/138; 356/375; 250/559.29
[58] Field of Search ........................... 250/559.29, 559.3; 356/371, 375, 138

[56] References Cited

U.S. PATENT DOCUMENTS

| | | | |
|---|---|---|---|
| Re. 35,350 | 10/1996 | Shahar et al. ............................ | 356/375 |
| 4,589,773 | 5/1986 | Ido et al. ................................ | 356/371 |
| 4,634,879 | 1/1987 | Penney .................................... | 250/560 |
| 4,723,845 | 2/1988 | Mizutani et al. ....................... | 356/375 |
| 4,758,731 | 7/1988 | Schuster ................................. | 250/560 |
| 4,971,443 | 11/1990 | Koyagi ................................... | 356/375 |
| 4,978,841 | 12/1990 | Barrett et al. .......................... | 250/548 |
| 5,049,757 | 9/1991 | Holzl ...................................... | 250/561 |
| 5,191,221 | 3/1993 | Von Rosmalen et al. .............. | 250/561 |
| 5,216,649 | 6/1993 | Koike et al. .......................... | 369/44.23 |
| 5,302,834 | 4/1994 | Murao .................................... | 250/561 |
| 5,392,112 | 2/1995 | Nakamura ............................ | 356/139.1 |
| 5,420,945 | 5/1995 | Concannon et al. ................... | 250/560 |
| 5,436,721 | 7/1995 | Pence et al. ........................... | 356/154 |
| 5,510,892 | 4/1996 | Mizutani et al. ..................... | 356/139.1 |
| 5,530,550 | 6/1996 | Nikoonahad et al. ................. | 356/375 |
| 5,576,831 | 11/1996 | Nikoonahad et al. ................. | 356/375 |

*Primary Examiner*—Robert H. Kim
*Assistant Examiner*—Zandra V. Smith
*Attorney, Agent, or Firm*—Richard A. Tomlin; Ronald V. Davidge

[57] ABSTRACT

A device is provided for determining the height and/or tilt of local features on the surface of a sample. The device includes a laser projecting a collimated beam at an oblique angle at a reflection point on the sample surface and a converging lens having an optical axis extending at an angle of reflection equal to the angle of incidence from the reflection point. The focusing characteristics of the lens are used to separate the deflection of the reflected collimated beam due to tilt of the surface from such deflection due to linear displacement of the surface.

13 Claims, 3 Drawing Sheets

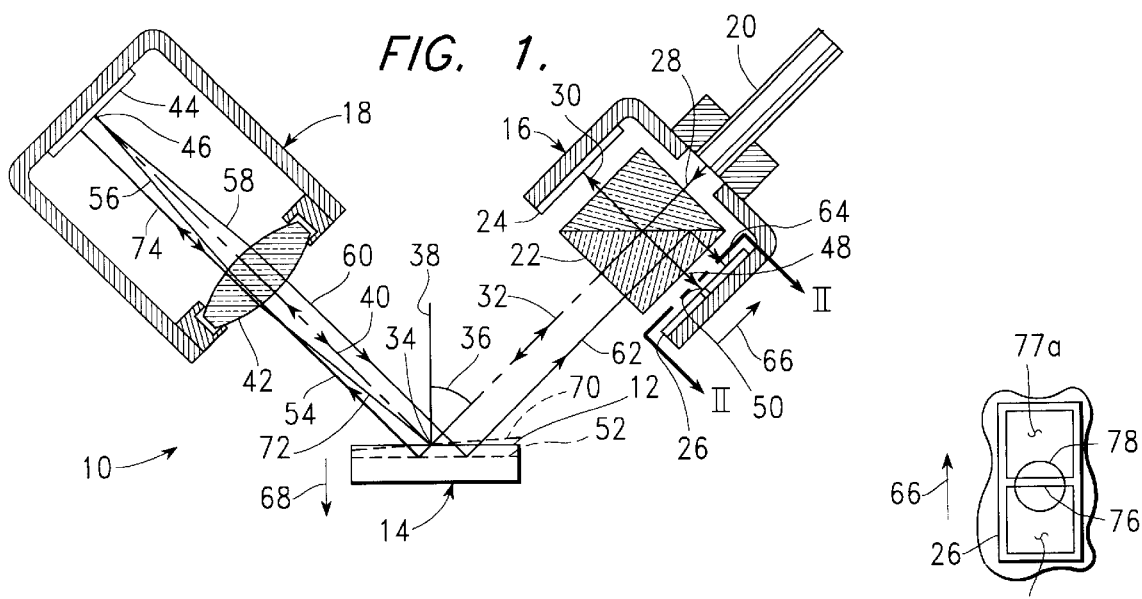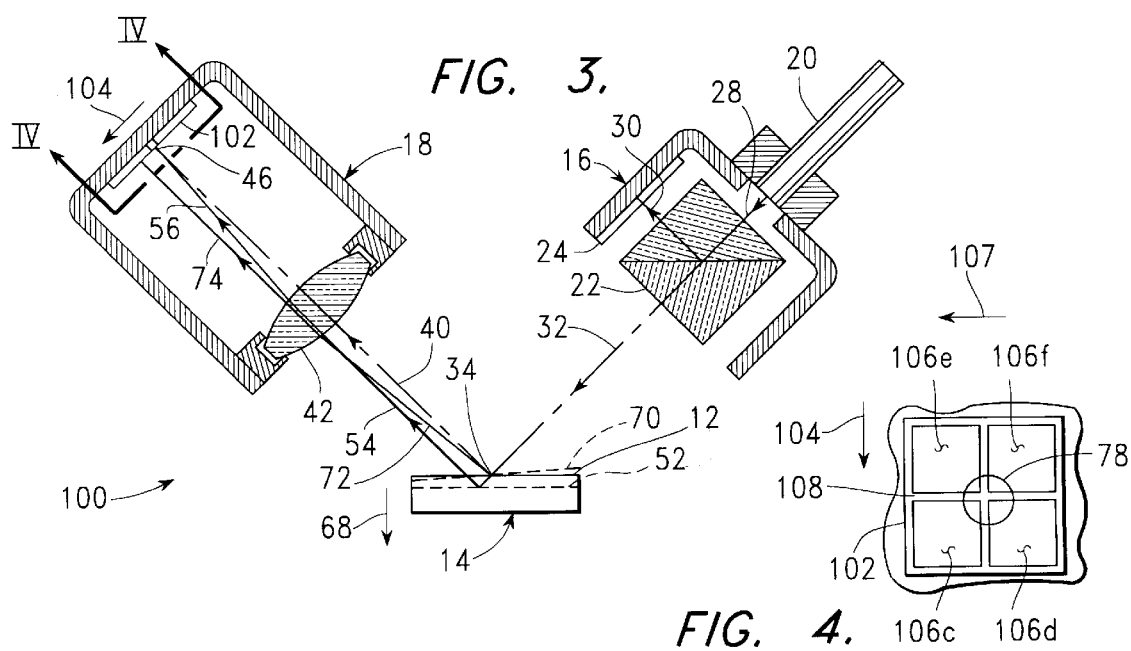

OPTICAL APPARATUS FOR DETERMINING THE HEIGHT AND TILT OF A SAMPLE SURFACE

BACKGROUND OF THE INVENTION

1. Field of the Invention

The present invention relates to measuring both the local height and angular inclination of a test surface, and, more particularly, to making such measurements simultaneously using the reflection of a laser beam off the test surface.

2. Background Information

Conventional methods use a reflected laser probe to determine the height of a sample surface, while other methods use a reflected laser probe to determine the angular inclination of a sample surface. Generally, conventional methods for determining height ignore the tilt, or angular inclination, of the sample surface, allowing such tilt, if it is present, to contribute an error to the height measurement. Conventional methods determining the tile ignore variations in the height of the sample surface, allowing such variations, if they are present, to contribute an error to the tilt measurement.

What is needed is a simple method for simultaneously measuring both height and tilt of a sample surface from which a laser beam is reflected. Such a method should be simple, both in the setup procedures required, and in the form in which data is developed within the device.

DESCRIPTION OF THE PRIOR ART

A number of U.S. Patents describe means for using a laser or light beam to the tilt, or angular inclination, of a surface without measuring variations in its height. The accuracy of these methods is furthermore generally compromised by variations in the height of the surface being measured if such variations occur. For example, U.S. Pat. No. 5,436,721 describes a wafer tilt gauge having a wafer mounting structure which is rocked to determine the effects of such motion on the angular positioning of the wafer. U.S. Pat. No. 5,302,834 describes an optical tilt measuring system, to be made part of an optical pickup reading information recorded on a recording surface of an optical information storage medium, with the optical tilt measuring system determining whether a correction for tilt is needed. U.S. Pat. No. 5,216,649 describes an optical head device including a tile servo mechanism using photodetectors for detecting rays of light reflected from the recording surface of an optical disk, with each photodetector receiving light reflected from the recording surface being partitioned into two detector cells, so that the differential output of the two cells is used to obtain a tilt signal.

On the other hand, other U.S. Patents describe means for using a laser or light beam to measure the local height of a sample surface without measuring its tilt, with the height measurements being affected by variations in the angular inclination, or tilt, of the surface being measured if such variations exist. For example, U.S. Pat. No. 4,589,773 describes a position detecting system for the position control of the surface of a workpiece mounted in an electron beam exposure system, with the position detecting system including a first optical system for focusing a light beam on the workpiece, a position-controlling table on which the workpiece is mounted, and a second optical system for focusing light reflected from the workpiece on a photodetector. U.S. Pat. No. 4,971,443 describes a method for optically detecting the position of an object having a surface including two regions, each of which has a different coefficient of reflectance. U.S. Pat. No. 4,723,845 describes optical apparatus for detecting the position, or height, of an object by projecting a light image onto the object at an oblique angle through a transparent plate and by detecting the reflected light from the object through the transparent plate. U.S. Pat. No. 4,634,879 describes the use of triangulation with only two photomultiplier tubes to sense the position of a flying spot. U.S. Pat. No. 5,576,831 describes reflected light apparatus for measuring height which may incorporated within a particle detection system that scans patterned wafers with obliquely incident light to search for particles with a particle detector positioned to receive scattered light. U.S. Pat. No. 5,191,221 describes a method using a projected light to determine the position of an axis of a rotating mirror within a scanning system, with motion of the axis in a direction transverse to the projected beam being detected through movement of the reflected spot, and with movement of the axis parallel to the projected beam being detected through a change in the shape of the reflected spot.

U.S. Pat. No. 5,510,892 is an example of complex apparatus for measuring both the inclination of a sample surface and the thickness of the sample on which measurements are made. This apparatus is further limited by requiring the sample to be transparent.

SUMMARY OF THE INVENTION

It is therefore an objective of the present invention to provide a method of determining the local height of a sample surface by measuring a reflected beam resulting from directing a light or laser beam at the surface, with variations in the angular inclination of the test surface not affecting the accuracy of the height measurements.

It is another objective of the present invention to provide a method of determining the local tilt of a sample surface by measuring a reflected beam resulting from directing a light or laser beam at the surface, with variations in the height of the test surface not affecting the accuracy of the tilt measurements.

It is another objective of the present invention to provide a method of simultaneously determining the local height and tilt of a sample surface from independent measurements of a reflected beam resulting from directing a light or laser beam at the surface.

In accordance with a first aspect of the present invention, there is provided apparatus for measuring linear displacement of a sample surface from a nominal level in a direction perpendicular to the sample surface at a nominal inclination. This type of distance is generally hereinafter called "height," reflecting a concern with determining the height of surface features, rather than an upward vertical distance. The apparatus includes projection means, a converging lens, a first photodetector, and first imaging means. The projection means projects an energy beam at the sample surface to strike the sample surface at the nominal level at a reflection point and at an oblique angle of incidence relative to the sample surface at the nominal inclination. The converging lens has a first focal point, displaced in a first direction from the converging lens, at the reflection point, with an optical axis extending at an angle of reflection relative to the sample surface at the nominal inclination equal to the oblique angle of incidence, and with a second focal point displaced opposite the first direction from the converging lens. The first photodetector produces a signal in response to a position at which the first photodetector is struck by the energy beam. The first imaging means directs a portion of the energy beam, having been reflected at the sample surface and refracted through the converging lens, to the first photodetector, wherein the first imaging means directs a ray travelling coincident with the optical axis from the converging lens opposite the first direction to strike the first photodetector at a first central point, wherein the first imaging means directs a ray travelling from the converging lens through the second focal point to fall on the first photodetector at a first displacement distance from the first central point, with the first displacement distance increasing with an angle between the ray and the optical axis at the second focal point, and wherein the first imaging means directs a ray travelling parallel to the optical axis from the converging lens opposite the first direction to strike the first photodetector at the first central point.

In accordance with a second aspect of the present invention, there is provided apparatus for angular displacement of a sample surface from a nominal inclination. This angular displacement from a nominal inclination is generally hereinafter called "tilt." The apparatus includes projection means, a converging lens, and a photodetector. The projection means projects an energy beam at the sample surface to strike the sample surface at the nominal level at a reflection point and at an oblique angle of incidence relative to the sample surface at the nominal inclination. The converging lens has a first focal point, displaced in a first direction from the converging lens, at the reflection point, an optical axis extending at an angle of reflection relative to the sample surface at the nominal inclination equal to the oblique angle of incidence, and a second focal point displaced opposite the first direction from the converging lens. The photodetector produces a signal in response to a position at which the photodetector is struck by the energy beam, with the photodetector extending through the second focal point perpendicular to the optical axis.

BRIEF DESCRIPTION OF THE DRAWINGS

FIG. 1 is a longitudinal cross-sectional view of apparatus built in accordance with the present invention for measuring variations in the height of a surface of a sample;

FIG. 2 is a fragmentary cross-sectional view of the apparatus of FIG. 1, being taken as indicated by section lines II—II in FIG. 1 to show geometrical characteristics of a height-sensing photodetector therein;

FIG. 3 is a longitudinal cross-sectional view of alternative apparatus built in accordance with the present invention to measure the tilt of a sample surface;

FIG. 4 is a fragmentary cross-sectional view of the apparatus of FIG. 2, being taken as indicated by section lines IV—IV in FIG. 4 to show geometrical characteristics of a tilt-sensing photodetector therein;

DETAILED DESCRIPTION

Figure 5:
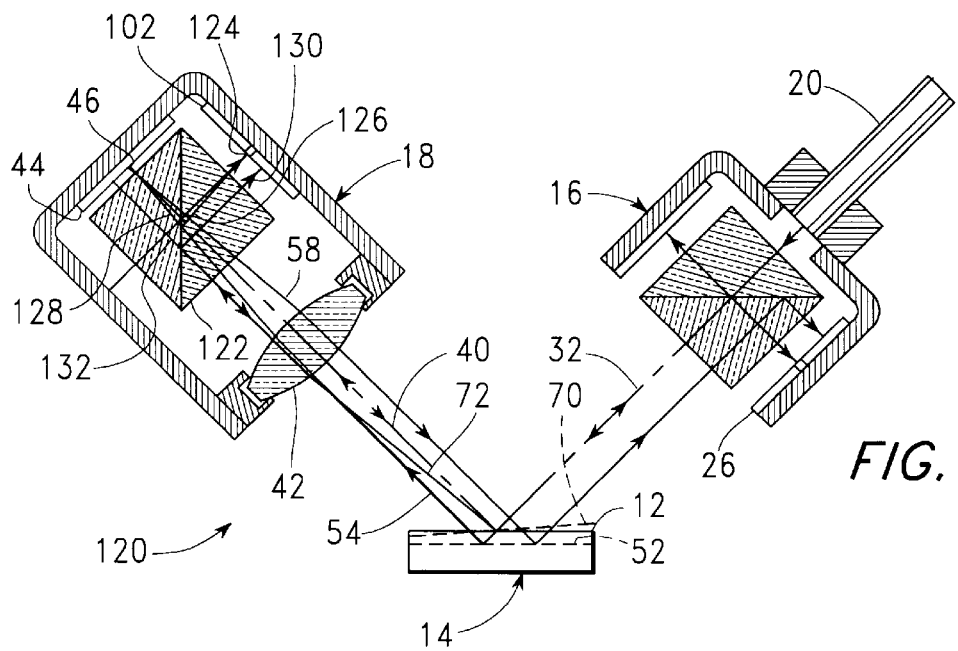
FIG. 5 is a longitudinal cross-sectional view of apparatus built in accordance with the present invention for measuring variations in the height and tilt of a surface of a sample.

The present invention makes use of the focusing properties of a converging lens to differentiate between the deflection of a beam reflected from the surface of a sample due to variations in the height of the surface and the deflection of the beam due to variations in the angular inclination or tilt of the surface. Specifically, a converging lens refracts all incoming light rays which are parallel to its optical axis to pass through its focal point, and refracts all light rays entering the lens from its focal point to leave the lens parallel to its optical axis.

FIG. 1 is a longitudinal cross-sectional view of apparatus 10 built in accordance with the present invention for measuring variations in the height of a surface 12 of a sample 14. This apparatus 10 includes a first optical subsystem 16 and a second optical subsystem 18. The first optical subsystem 16 incudes a laser 20, which may be, for example a He-Ne laser, used as a collimated light source, a beamsplitter 22, a power sensing photodetector 24, and a height-sensing photodetector 26. In the beamsplitter 22, the output beam 28 of laser 20 is divided into a reflected portion 30, which produces a power level signal within the power sensing photodetector 26, and a transmitted beam 32, which is projected to strike the sample surface 12 at a nominal reflection spot 34 and at an angle of incidence 36 with respect to a normal line 38 extending upward from the nominal inclination of the surface 12. With the surface 12 at its nominal inclination and at a nominal height, the projected beam 32 is reflected along a central line of reflection 40.

Within the second optical subsystem 18, a converging lens 42 is mounted so that its optical axis lies along the central line of reflection 40 and so that its front focal point lies at the nominal reflection spot 34. A reflector 44 is mounted so that it extends through the back focal point 46 of the converging lens 42 in a plane perpendicular to the central line of reflection 40 (and the optical axis of converging lens 42). With the surface 12 at its nominal inclination and at a nominal height, the projected beam reflected off the sample surface 12 along central line 40 is reflected from the surface of reflector 44 to return along the central line 40, and is again reflected from the sample surface 12 to return along the line at which the ray 32 is projected. Within the beamsplitter 22, this beam is next reflected as a beam 48 into a central spot 50 within the height-sensing photodetector 26.

If the height of the surface 12 is depressed from its nominal position, as indicated by the dashed line 52, the laser beam 32 is reflected along a line 54 extending below the central line 40, but parallel thereto, since, in this exemplary condition, the surface 12 is not tilted. Thus, this beam, being reflected along the line 54, enters the lens 42 in a direction parallel to the optical axis of the lens, to be refracted to pass along a line 56 through the back focal point 46 of the lens. Since the reflector 44 is at this back focal point 46, the beam is next reflected along a line 58. This reflection, passing into the lens 42 from the back focal point 46, is refracted to leave the lens 42 along a line 60 extending above the central reflection line 40 but parallel thereto. Next, the reflected beam is again reflected off the sample surface 12, to travel along a line 62 parallel to the line along which the laser beam 32 is projected, but displaced therefrom, to be reflected within the beamsplitter 22 to strike the height-sensing photodetector 26 at a point 64 displaced from the central spot 50 in the direction of arrow 66. Thus, the vertical, or height, displacement of the sample surface 12 in the downward direction of arrow 68 is indicated by the movement of a reflected spot on the height-sensing photodetector 26 in the direction of arrow 66. Similarly, a displacement of the sample surface 12 in an upward direction opposite to that of arrow 68 is indicated by the movement of a reflected spot on the height-sensing photodetector 26 opposite the direction of arrow 66.

On the other hand, if the sample surface 12 is tilted without being vertically displaced, as indicated by the dashed line 70, the projected laser beam 32 is reflected from the front focal point 34 of convergent lens 42 along an angularly displaced line 72, being therefore refracted by the lens 42 to travel along a line 74 displaced from the central reflection line 40 (and from the optical axis of lens 42) but parallel thereto. Since this line 74 is also perpendicular to the surface of reflector 44, the reflected laser beam is next reflected to travel in the opposite direction along the same line 74. Since this line 74 is also parallel to the optical axis of lens 42, the beam is next refracted within the lens 42 to travel through the front focal point 34 of the lens 42. At this point 42, the beam is reflected on the sample surface 12, to travel back along the path of the projected beam 32, and to be reflected within the beamsplitter 22 to the central spot 50 of the height-sensing photodetector 26. Thus, tilting the sample surface 12 from its nominal configuration does not move the reflected spot on height-sensing photodetector from its central position 50.

FIG. 2 is a fragmentary cross-sectional view of the apparatus of FIG. 1, being taken as indicated by section lines II—II in FIG. 1 to show geometrical characteristics of the height-sensing photodetector 26. The photodetector 26 is preferably a bi-cell detector having a pair of photosensitive surfaces A and B, separated by a gap 76. The spot 78, resulting from reflection of the beam from laser 20 within the apparatus 10, as described above in reference to FIG. 1, is preferably significantly larger than the width of gap 76 and significantly smaller than one of the photosensitive surfaces 77a, 77b. Within the spot 78, an illumination or radiation intensity may be reduced with distance from the center of the spot in general accordance with a gaussian distribution. A useful measurement of the movement of the spot 78 in the direction of arrow 66 is given by the following expression:

$$x = \frac{A - B}{A + B}$$

where A is the value of the output signal from photosensitive element 77a and B is the value of the output signal from photosensitive element 77b. This expression is, for example, positive when the illuminated spot 78 is displaced from the central spot 50 in the direction of arrow 66, zero when the illuminates spot 78 is at the central spot 50, and negative when the illuminated spot 78 is displaced from the central spot 50 opposite the direction of arrow 66.

The height-sensing photodetector 26 is, for example, a bi-cell detector supplied by Advanced Photonix, Inc. of Camarillo, Calif., under their part number SD 385-24-21-041. Each of the two cells of such a device produces an electrical current which is generally proportional to the light energy it absorbs.

The output of power-detecting photodetector 24 is preferably used to provide a feedback signal in a circuit regulating the power to the laser 20. Alternately, the sum of the outputs of photosensitive elements 77a and 77b may be used for this purpose.

FIG. 3 is a longitudinal cross-sectional view of alternative apparatus 100 built in accordance with the present invention to measure the tilt of the sample surface 12, with variations in the height of the sample surface 12 having a minimal effect on the tilt measurements being made. A number of the components of this apparatus 100 are similar or identical to the components described above in reference to FIG. 1 and are therefore assigned like reference numerals with these components. Furthermore, the exemplary displacements of the sample surface 12 and the resulting reflections of the projected beam 32 are also as described in FIG. 1, and are thus also afforded like reference numerals. In the alternative apparatus 100, the height-sensing photodetector 26 within first optical subsystem 16 of FIG. 1 is eliminated, and the reflector 44 within second optical subsystem 18 is replaced with a tilt-sensing photodetector 102. The laser 20 and converging lens 42 of alternative apparatus 100 are set up as described above in reference to FIG. 1, with the front focal point of the converging lens 42 at the point 34 where the projected laser beam 32 strikes the sample surface 12 in its nominal position. Thus, under nominal conditions of the sample surface 12, the projected laser beam 32 is reflected to travel along the central reflection line 40 striking the tilt-sensing photodetector 102 at its mid point, which is placed at the rear focal point 46 of the convergent lens 42.

When the sample surface 12 is displaced downward without tilting, as indicated by dashed lines 52, the reflection of beam 32 along line 54, parallel to central reflection line 40 (and to the optical axis of convergent lens 42) results in the refraction of this reflection along line 56 to go through the rear focal point of the lens 42. Thus, a variation solely in the height of sample surface 12 from its nominal position does not result in the movement of the reflected ray along the tilt-sensing photodetector 102 from the central position 46 in which it strikes the photodetector 102 with the sample surface 12 at its nominal height.

On the other hand, when the sample surface 12 is tilted without vertical displacement, as indicated by dashed line 70, the resulting reflection along line 72 from the front focal point 34 of lens 42 is refracted to travel along a line 74 parallel to the central reflection line 40, being displaced along the surface of tilt sensing photodetector 102 in the direction of arrow 104.

The preceding example describes the effects of tilting the sample surface 12 about a tilt axis extending through the point of reflection 34 along the sample surface 12 perpendicular to the plane of both projected ray 32 and central reflection line 40. In general, it is also likely that tilting may occur about an axis extending through the point of reflection 34 perpendicular to the original tilt axis. Thus the tilt-sensing photodetector 102 is a quadrant detector having a two-dimensional array of photosensitive elements to detect movement of a light beam in two, mutually perpendicular directions.

FIG. 4 is a fragmentary cross-sectional view of the apparatus of FIG. 3, being taken as indicated by section lines IV—IV in FIG. 3 to show the photosensitive elements of the tilt-sensing photodetector 102. These photosensitive elements 106c, 106d, 106e, and 106f are used to provide an indication of the movement of the spot 78 in the direction of arrow 104 in accordance with the following expression:

$$y = \frac{C + D - E - F}{C + D + E + F}$$

where C is the output of photosensitive element 106c, D is the output of photosensitive element 106d, etc. Similarly, movement of the spot 78 in the direction of arrow 107, i.e. perpendicular to the direction of arrow 104 is determined in accordance with the following expression:

$$z = \frac{C + E - D - F}{C + D + E + F}$$

The diameter of the spot 78 is preferably significantly larger than the width of the gaps 108 between adjacent photosensitive elements 106 and significantly smaller than the individual photosensitive elements 106.

The tilt-sensing photodetector 102 is, for example, a quadrant detector supplied by Advanced Photonix, Inc. of Camarillo, Calif., under their part number SD 380-23-21-051.

FIG. 5 is a longitudinal cross-sectional view of alternative apparatus 120 built in accordance with the present invention to measure both the height and tilt of the sample surface 12, with variations in the tilt of the sample surface 12 having a minimal effect on the height measurements being made, and with variations in the height of the sample surface 12 having a minimal effect on the tilt measurements being made. A number of the components of this apparatus 120 are similar or identical to the components described above in reference to FIG. 1 and are therefore assigned like reference numerals with these components. Furthermore, the exemplary displacements of the sample surface 12 and the resulting reflections of the projected beam 32 are also as described in FIG. 1, and are thus also afforded like reference numerals.

The alternative apparatus 120 includes both the height-sensing photo-detector 26 of FIG. 1 and the tilt-sensing photodetector 102 of FIG. 2. However, placing the tilt-sensing photodetector 102 as shown in FIG. 2 would make the height-sensing photodetector 26 inoperable, since its operation depends on receiving light reflected from the reflector 44 shown in FIG. 1. The tilt-sensing photodetector 102 absorbs light, failing to reflect a significant percentage of the light striking it in the manner of the reflector 44. Therefore, in the apparatus 120, a second beamsplitter 122 is added to direct a portion of the light passing into the second optical subsystem 18 through the converging lens 42 into the tilt-sensing photodetector 102, which is mounted on the side of this subsystem 18. The remaining portion of this light is transmitted through the beamsplitter 122 to be reflected off the reflector 44. The apparatus is configured and, if necessary, adjusted, so that the back focal point 46 of the converging lens 42 is at the surface of the reflector 44, and so that a reflected image 124 of this back focal point is at the center of the surface of the tilt-sensing photodetector 102, with focal distances corrections being made for the effect of beams travelling through the material of the beamsplitter 122.

Continuing to refer to FIG. 5, with the sample surface 12 at nominal conditions, the beam 32 from laser 20 is reflected along central reflection line 40 to be partly reflected within the beamsplitter 122 to the reflected back focal point 124 of the lens 42, where it equally illuminates the four photosensitive surfaces 106 (shown in FIG. 4) of the tilt-sensing photodetector 102, producing an output indicating a lack of tilt in either direction. The remaining portion of this beam reflected along the central reflection line 40 is transmitted through the beamsplitter 122 to be centrally reflected from reflector 44, returning along the central reflection line 40 and along the line of laser beam 32, being reflected by first beamsplitter 32 to equally illuminate the two photosensitive surfaces 77 (shown in FIG. 2) of the height-sensing photodetector 26, thus producing an indication of no variation in sample surface height from its nominal level.

When the sample surface 12 is depressed as indicated by dashed line 52, the resulting beam reflected along line 52 is refracted by lens 42 to form a first sub-beam 126 reflected within beamsplitter 122 to strike the reflected back focal point 124, indicating that no tilt has occurred, and a second sub-beam 128 transmitted through beamsplitter 122 to strike the back focal point 46, thereafter being reflected and refracted through the system as beam 58, in the manner explained above relative to FIG. 1. When the sample surface 12 is tilted, as indicated by dashed line 70, the resulting reflected beam 72 is refracted by lens 42 to travel, along line 74, parallel to the central line of reflection 40, and to form a first sub-beam 130 within beamsplitter 122, which strikes the tilt-sensing photodetector 102 offset from its center, indicating a sample surface tilt condition. The beam travelling along line 74 also form a second sub-beam 132, which is reflected and refracted to travel back along its path 72, striking the height-sensing photodetector 26 in a central position indicating no change in sample surface height form the nominal, in the manner described for the beam travelling along line 74 in reference to FIG. 1.

Figure 6:
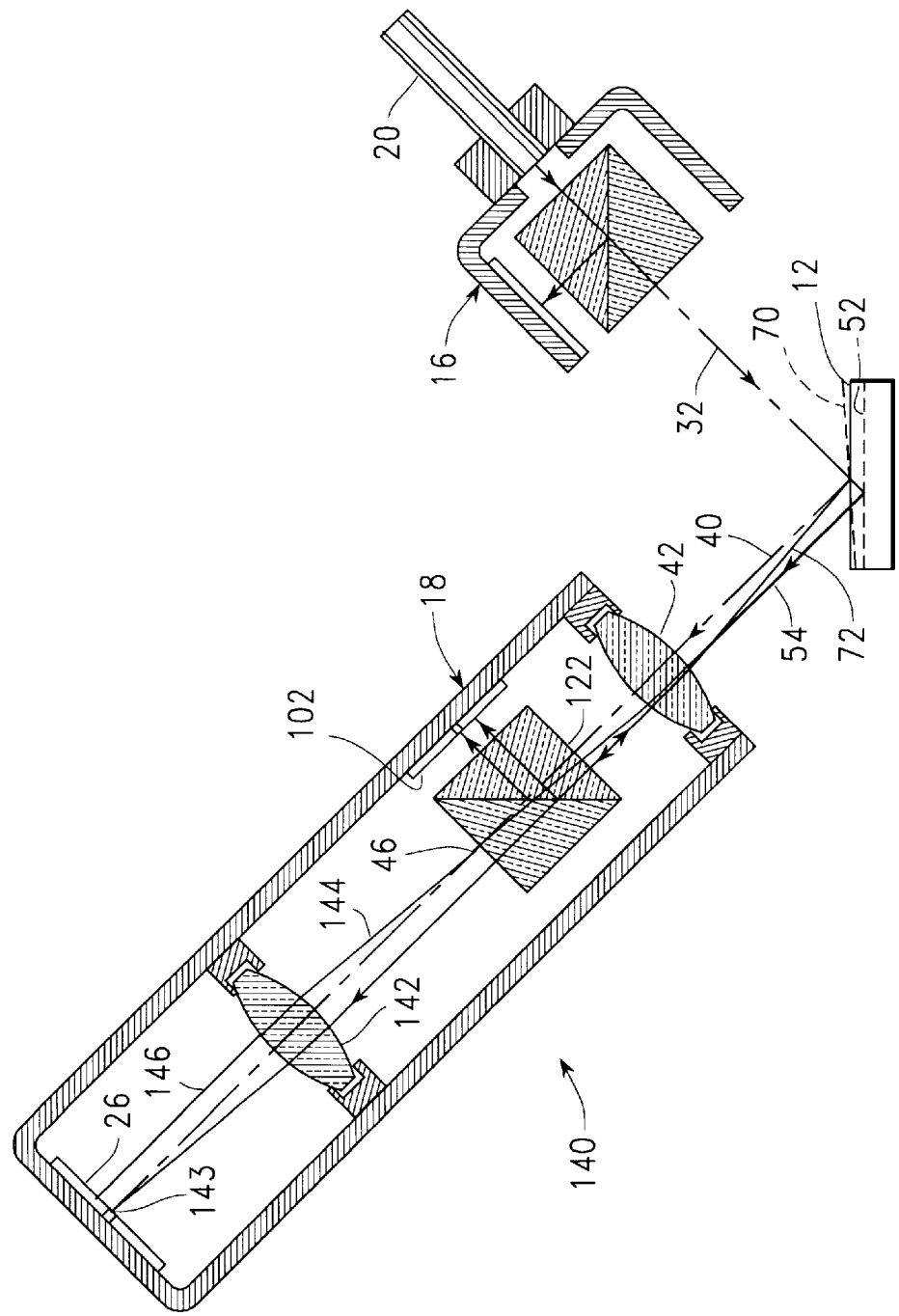
FIG. 6 is a longitudinal cross-sectional view of alternative apparatus built in accordance with the present invention for measuring variations in the height and tilt of a surface of a sample.

FIG. 6 is a longitudinal cross-sectional view of alternative apparatus 140 built in accordance with the present invention to measure both the height and tilt of the sample surface 12, with variations in the tilt of the sample surface 12 having a minimal effect on the height measurements being made, and with variations in the height of the sample surface 12 having a minimal effect on the tilt measurements being made. A number of the components of this apparatus 120 are similar or identical to the components described above in reference to FIG. 5 and are therefore assigned like reference numerals with these components. Furthermore, the exemplary displacements of the sample surface 12 and the resulting reflections of the projected beam 32 are also as described in FIG. 5, and are thus also afforded like reference numerals.

In the apparatus of FIG. 5, a focusing lens 142 is added to the second optical subsystem 18, and the height-sensing photodetector 26 is moved from the first optical subsystem 16 to the second optical subsystem 18, where it is imaged through the focusing lens 142. The beamsplitter 122 and tilt-sensing photodetector 102 operate generally as described above in reference to FIG. 5, having the previously-described geometrical relationships with the converging lens 42. The focusing lens 142 is placed so that its optical axis is collinear with central reflection line 40, and hence with the optical axis of lens 42. The focusing lens 142 is also placed so that its front focal point is coincident with the back focal point 46 of lens 42.

When the sample surface 12 is held in its nominal position, the beam 32 from laser 20 is reflected to travel along central reflection line 40 to a central point 143 of the height-sensing photodetector 26, indicating that the height of the sample surface 12 is indeed nominal. However, when the sample surface 12 is moved downward, as indicated by dashed line 52, the beam travelling along line 54 is refracted by converging lens 42 to pass along line 144 through its back focal point 46. Since this point 46 is also the front focal point of focusing lens 142, this lens 142 refracts the beam to travel along a line 146, parallel to central reflection line 40 but displaced therefrom, indicating a change in sample surface height by exposing the photosensitive elements 76 (shown in FIG. 2) of height-sensing photodetector 26 unevenly.

On the other hand, when the sample surface 12 is tilted, as indicated by dashed line 70, the resulting reflected beam along line 72 from the front focal point 34 of lens 42 is refracted by this lens 42 to travel along line 148 parallel to the central reflection axis 40 but displaced therefrom. The focusing lens 142 refracts this beam to go through its back focal point 143. Since this back focal point 143 is at the center of height-sensing photodetector 26, a height change is not indicated.

Another version of the present invention may be built as a device for measuring only changes in surface height, using the apparatus of FIG. 6 with the prism 122 and tilt-sensing photodetector 102 eliminated.

The preceding discussion, in reference to FIGS. 1–6 has assumed that the sample surface is either translated, being changed in height, or tilted. The more reasonable assumption that sample surface may move with a combination of such translation and tilting introduces a small error, giving rise to an interdependence between the resulting beam deflections due to changes in translation and tilt. This occurs because translation moves the point of reflection off the sample surface away from the focal point of the converging lens 42, so that the effect of surface tilt is slightly changed, and because tilting moves the reflected beam away from the optical center line of the converging lens 42, so that the effect of a change is height is slightly changed. However, these changes are "second order" effects, which are much less significant than the inaccuracies occurring within various measuring devices of the prior art, which do not take advantage of the focusing properties of a lens to separate the effects of tilt and height changes.

The devices described above as versions of the present invention may be used as part of an inspection process or as part of a production process. In an inspection process, a sample surface is driven past an inspection device incorporating the present invention, which produces an output signal representing the height and/or tilt variations encountered during the inspection process.

A co-pending U.S. application, Ser. No. 08/1707,383, filed Sep. 4, 1996, entitled "Optical Apparatus for Dual Beam Laser Texturing," having a common assignee with the present invention, which is hereby incorporated by reference, describes a disk texturing system with a laser directed at a beamsplitter to split the laser beam into two beams having approximately equal power, which are directed along parallel paths through a power control optics block to expose simultaneously opposite sides of the disk to be textured. The power control optics block includes means for attenuating and measuring each of the two beams.

Figure 7:
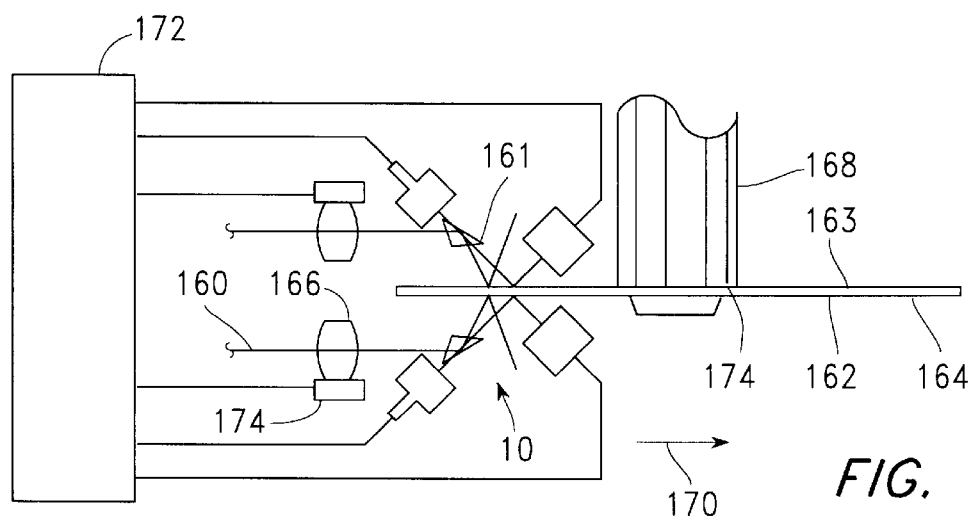
FIG. 7 is a fragmentary view of the laser texturing system including a pair of the height-measuring devices of FIG. 1.

FIG. 7 is a fragmentary view of the laser texturing system described in detail within the referenced co-pending application, additionally including a pair of height-measuring devices 10, as described herein in reference to FIG. 1. A pair of pulsed, high energy texturing laser beams 160 are aimed, by means of prisms 161, at opposing side surfaces 162, 163 of the disk 164 being textured. Each of these beams 160 is focused to form an appropriately sized spot by means of a lens 166. During the texturing process, the disk 164 is spun on a rotating spindle 168, which is also translated in the direction of arrow 170, so that a spiral pattern of textured spots is formed.

The texturing process can be affected by a number of variables changing the position ar which the texturing laser beams 160 strike the disk surfaces 162. For example, variations in the overall thickness of the disk 164, runout conditions caused by imperfect clamping to the spindle 168, and out of flat conditions of the disk 164 can change this position. To compensate for such variations, height measuring apparatus 10 is placed at each side of the disk 164, and the resulting measurements of height changes from a nominal condition are used within a controller 172 to effect the movement of each lens 166 through an associated actuator 174. In this way, an autofocus function is provided. Alternately, or in addition to providing this autofocus function, the outputs of the height-measuring devices 10 may be used to monitor run-out conditions, stopping the process when too much variation in height is experienced.

While the example of FIG. 7 shows a height-measuring device 10 on each side of the disk 164, it is also possible that only one height measuring device 10 is needed, if most of the factors affecting variation in the position at which reflection of the texturing disk occur only on one side of the disk 164. In the example of FIG. 7, the disk surface 163 is clamped against a mounting surface 174 of the spindle 168, causing factors such as the thickness of the disk 164 to affect only the imaging of the opposite surface 164, so that a significant, perhaps sufficient, improvement is achieved using only a single height measuring system 10, directed at the side 164.

What is claimed is:

1. Apparatus for measuring linear displacement of a sample surface from a nominal level in a direction perpendicular to said sample surface at a nominal inclination, wherein said apparatus comprises:

projection means for projecting an energy beam at said sample surface to strike said sample surface at said nominal level at a reflection point and at an oblique angle of incidence relative to said sample surface at said nominal inclination;

a converging lens with a first focal point, displaced in a first direction from said converging lens, at said reflection point, with an optical axis extending at an angle of reflection relative to said sample surface at said nominal inclination equal to said oblique angle of incidence, and with a second focal point displaced opposite said first direction from said converging lens;

a first photodetector producing a signal in response to a position at which said first photodetector is struck by said energy beam; and first imaging means for directing a portion of said energy beam, having been reflected at said sample surface and refracted through said converging lens, to said first photodetector, wherein said first imaging means directs a ray traveling coincident with said optical axis from said converging lens opposite said first direction to strike said first photodetector at a first central point, wherein said first imaging means directs a ray traveling from said converging lens through said second focal point to fall on said first photodetector at a first displacement distance from said first central point, with said first displacement distance increasing with an angle between said ray and said optical axis at said second focal point, wherein said first imaging means directs a ray traveling parallel to said optical axis from said converging lens opposite said first direction to strike said first photodetector at said first central point, wherein said imaging means includes a reflector extending through said second focal point in a flat plane perpendicular to said optical axis, reflecting said energy beam, having been reflected at said sample surface and refracted through said converging lens, to be transmitted through said converging lens in said first direction and to be reflected again at said sample surface, forming a return beam, and a first beamsplitter directing a portion of said return beam to said first photodetector.

2. Apparatus for measuring linear displacement of a sample surface from a nominal level in a direction perpendicular to said sample surface at a nominal inclination, and for measuring angular displacement of said sample surface from said nominal inclination, wherein said apparatus comprises:

projection means for projecting an energy beam at said sample surface to strike said sample surface at said nominal level at a reflection point and at an oblique angle of incidence relative to said sample surface at said nominal inclination;

a converging lens with a first focal point, displaced in a first direction from said converging lens, at said reflection point, with an optical axis extending at an angle of reflection relative to said sample surface at said nominal inclination equal to said oblique angle of incidence, and with a second focal point displaced opposite said first direction from said converging lens;

a first photodetector producing a signal in response to a position at which said first photodetector is struck by said energy beam; and first imaging means for directing a portion of said energy beam, having been reflected at said sample surface and refracted through said converging lens, to said first photodetector, wherein said first imaging means directs a ray traveling coincident with said optical axis from said converging lens opposite said first direction to strike said first photodetector at a first central point, wherein said first imaging means directs a ray traveling from said converging lens through said second focal point to fall on said first photodetector at a first displacement distance from said first central point, with said first displacement distance increasing with an angle between said ray and said optical axis at said second focal point and with said linear displacement of said sample surface from said nominal level in a direction perpendicular to said sample surface, and wherein said first imaging means directs a ray traveling parallel to said optical axis from said converging lens opposite said first direction to strike said first photodetector at said first central point, a second photodetector producing a signal in response to a position at which said second photodetector is struck by said energy beam; and second imaging means for directing a portion of said energy beam, having been reflected at said sample surface and refracted through said converging lens, to said second photodetector, wherein said second imaging means directs a ray traveling coincident with said optical axis from said converging lens opposite said first direction to strike said second photodetector at a second central point, wherein said second imaging means directs a ray traveling from said converging lens to said second focal point to strike said second photodetector at said second central point, and wherein said second imaging means directs a ray traveling from said converging lens opposite said first direction parallel to said optical axis to fall on said second photodetector at a second displacement distance from said second central point, with said second displacement distance increasing with a displacement distance between said ray and said optical axis, and with said angular displacement of said sample surface from said nominal inclination.

3. The apparatus of claim 2, wherein said second imaging means includes a beamsplitter directing a portion of said energy beam travelling opposite said first direction from said converging lens to said second photodetector, with said second central point being coincident with a reflection formed within said beamsplitter of said second focal point.

4. Apparatus for measuring angular displacement of a sample surface from a nominal inclination, wherein said apparatus comprises:

projection means for projecting an energy beam at said sample surface to strike said sample surface at said nominal level at a reflection point and at an oblique angle of incidence relative to said sample surface at said nominal inclination;

a converging lens with a first focal point, displaced in a first direction from said converging lens, at said reflection point, with an optical axis extending at an angle of reflection relative to said sample surface at said nominal inclination equal to said oblique angle of incidence, and with a second focal point displaced opposite said first direction from said converging lens;

a photodetector producing a first signal in response to a position at which said photodetector is struck by said energy beam, with said photodetector extending through said second focal point perpendicular to said optical axis.

5. The apparatus of claim 4, wherein said first signal is in response to a position in a second direction at which said photodetector is struck by said energy beam, and said photodetector additionally produces a second signal in response to a position in a direction perpendicular to said second direction at which said photodetector is struck by said energy beam.

6. Apparatus for measuring linear displacement of a sample surface from a nominal level in a direction perpendicular to said sample surface at a nominal inclination, and for measuring angular displacement of said sample surface from said nominal inclination, wherein said apparatus comprises:

projection means for projecting an energy beam at said sample surface to strike said sample surface at said nominal level at a reflection point and at an oblique angle of incidence relative to said sample surface at said nominal inclination;

a converging lens with a first focal point, displaced in a first direction from said converging lens, at said reflection point, with an optical axis extending at an angle of reflection, relative to said sample surface at said nominal inclination equal to said oblique angle of incidence, and with a second focal point displaced opposite said first direction from said converging lens;

a first beamsplitter, extending between said converging lens and said second focal point thereof, directing a first portion of an energy beam transmitted through said converging lens opposite said first direction to travel along a first optical path and a second portion of said energy beam transmitted through said converging lens opposite said first direction to travel along a second optical path;

a second beamsplitter, extending between said reflecting point and said projection means, directing a portion of an energy beam transmitted through said converging lens in said first direction to travel along a third optical path;

a flat reflector, extending at an end of said first optical path at an image of said second focal point, perpendicularly to an image of said optical axis;

a first photodetector, extending at an end of said third optical path perpendicularly to an image of said optical axis, wherein said first photodetector generates a first signal in response to a position at which said first photodetector is struck by an energy beam, whereby said first signal provides an indication of linear displacement of said sample surface from said nominal level in a direction perpendicular to said sample surface at said nominal inclination; and a second photodetector, extending at an end of said second optical path and at an image of said second focal point, perpendicularly to an image of said optical axis, wherein said second photodetector generates a second signal in response to a position at which said second photodetector is struck by an energy beam, and whereby said second signal provides an indication of angular displacement of said sample surface from said nominal inclination.

7. The apparatus of claim 5, wherein said second signal is in response to a position in a second direction at which said second photodetector is struck by said energy beam, and said photodetector additionally produces a third signal in response to a position in a direction perpendicular to said second direction at which said second photodetector is struck by said energy beam.

8. The apparatus of claim 6, wherein said first portion of an energy beam transmitted through said converging lens opposite said first direction is transmitted through said first beamsplitter; and said second portion of an energy beam transmitted through said converging lens opposite said first direction is reflected within said first beamsplitter.

9. The apparatus of claim 6, wherein said second beamsplitter additionally directs a portion of said energy beam projected opposite said first direction by said projection means to travel along a fourth optical path; and said apparatus additionally includes a third photodetector, extending at an end of said fourth optical path, producing a power level signal.

10. Apparatus for measuring linear displacement of a sample surface from a nominal level in a direction perpendicular to said sample surface at a nominal inclination, and for measuring angular displacement of said sample surface from said nominal inclination, wherein said apparatus comprises:

projection means for projecting an energy beam at said sample surface to strike said sample surface at said nominal level at a reflection point and at an oblique angle of incidence relative to said sample surface at said nominal inclination;

a converging lens with a first focal point, displaced in a first direction from said converging lens, at said reflection point, with an optical axis extending at an angle of reflection, relative to said sample surface at said nominal inclination equal to said oblique angle of incidence, and with a second focal point displaced opposite said first direction from said converging lens;

a focusing lens with a first focal point, displaced in said first direction from said focusing lens, coincident with said second focal point of said converging lens. and with an optical axis aligned with said optical axis of said converging lens, and with a second focal point displaced opposite said first direction from said focusing lens;

a first beamsplitter, extending between said converging lens and said second focal point thereof, directing a first portion of an energy beam transmitted through said converging lens opposite said first direction to travel along a first optical path through said focusing lens and a second portion of said energy beam transmitted through said converging lens opposite said first direction to travel along a second optical path;

a first photodetector, extending at an end of said first optical path perpendicularly to an image of said optical axis of said focusing lens and at an image of said second focal point of said focusing lens, wherein said first photodetector generates a first signal in response to a position at which said first photodetector is struck by an energy beam, whereby said first signal provides an indication of linear displacement of said sample surface from said nominal level in a direction perpendicular to said sample surface at said nominal inclination; and a second photodetector, extending at an end of said second optical path and at an image of said second focal point of said converging lens, perpendicularly to an image of said optical axis of said converging lens, wherein said second photodetector generates a second signal in response to a position at which said second photodetector is struck by an energy beam, and whereby said second signal provides an indication of angular displacement of said sample surface from said nominal inclination.

11. The apparatus of claim 10, wherein said second signal is in response to a position in a second direction at which said second photodetector is struck by said energy beam, and said second photodetector additionally produces a third signal in response to a position in a direction perpendicular to said second direction at which said second photodetector is struck by said energy beam.

12. The apparatus of claim 10, wherein said first portion of an energy beam transmitted through said converging lens opposite said first direction is transmitted through said first beamsplitter; and said second portion of an energy beam transmitted through said converging lens opposite said first direction is reflected within said first beamsplitter.

13. The apparatus of claim 10, wherein said second beamsplitter additionally directs a portion of said energy beam projected opposite said first direction by said projection means to travel along a third optical path; and said apparatus additionally includes a third photodetector, extending at an end of said third optical path, producing a power level signal.

* * * * *